/ 22 / 84            XR            4,450,326

United States Patent [19]
Ledger

[11] 4,450,326
[45] May 22, 1984

[54] ANTI-THEFT VIBRATION DETECTOR SWITCH AND SYSTEM

[76] Inventor: Curtis G. Ledger, 1-A New Walnut St., North Plainfield, N.J. 07060

[21] Appl. No.: 312,690

[22] Filed: Oct. 19, 1981

[51] Int. Cl.³ .................................. H01H 35/02
[52] U.S. Cl. .................. 200/61.45 M; 340/566; 340/571; 340/683; 340/65; 200/61.52
[58] Field of Search ............. 340/566, 571, 683; 200/61.45 M, 61.45 R

[56] References Cited
U.S. PATENT DOCUMENTS

| | | | |
|---|---|---|---|
| 3,270,159 | 8/1966 | Soos | 200/65 |
| 3,372,253 | 3/1968 | Baker et al. | 200/61.45 R |
| 3,482,066 | 12/1969 | Zuehlke | 200/61.45 R |
| 3,619,524 | 11/1971 | Gillund | 200/61.45 M |
| 3,742,478 | 6/1973 | Johnson | 200/61.45 R |
| 3,748,415 | 7/1973 | Suzuki | 200/61.45 M |
| 4,009,662 | 3/1977 | Riparbelli | 102/70.2 R |
| 4,168,410 | 9/1979 | Norris | 200/61.45 M |
| 4,196,429 | 4/1980 | Davis | 340/571 |

*Primary Examiner*—Glen R. Swann, III
*Attorney, Agent, or Firm*—William T. Hough

[57] ABSTRACT

In a preferred embodiment, a steel ball having a surface coating of gold is magnetically held against each of negative and positive electrical switch contacts within a fenced-in space substantially filled with silicone fluid, the electrical switch contacts being alternately arranged in a circular series and being connected to a logic cell and mechanism adapted to count pulses resulting from each of breaking and making electrical contacts when the ball is jolted by vibration and to reset if at-least two consecutive pulses do not occur within half a second, and to send an alarm signal to a transmitter that transmits an alarm signal to a radio receiver, magnetic force lines being provided by a pole of a large bar magnet positioned behind the electrical switch contacts and a like-charge repelling-pole of a smaller bar magnet in front of and spaced-from the electrical switch contacts and ball.

9 Claims, 5 Drawing Figures

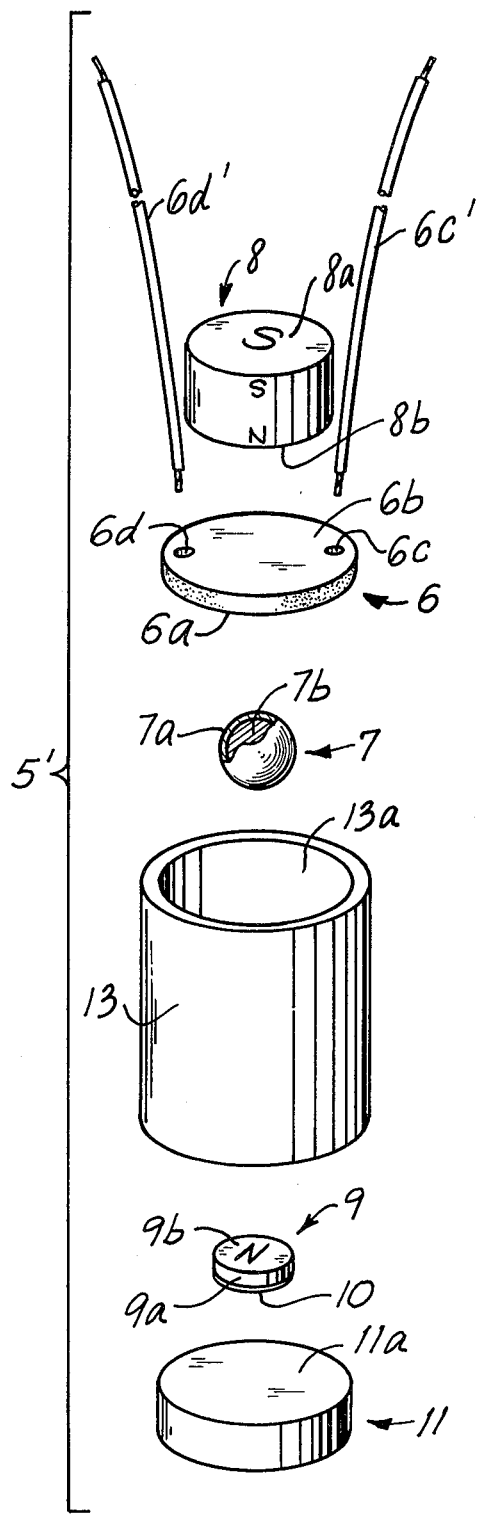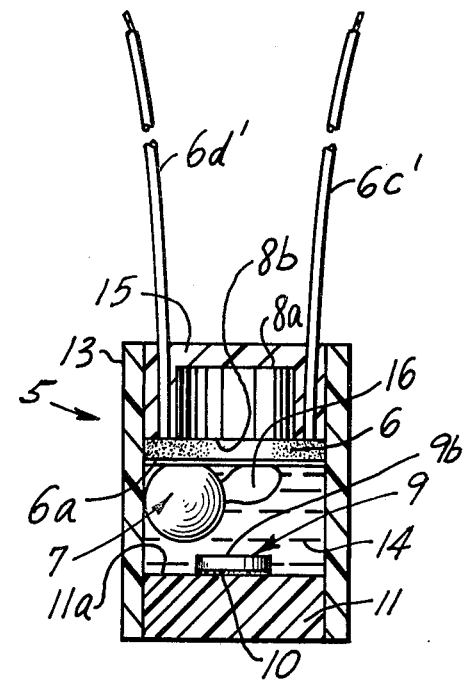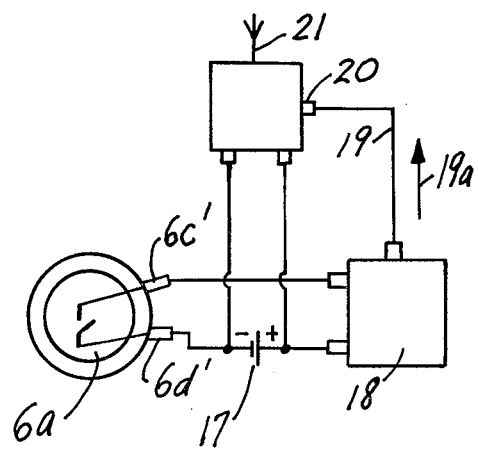
FIG. 1
FIG. 2
FIG. 3

ANTI-THEFT VIBRATION DETECTOR SWITCH AND SYSTEM

BACKGROUND OF THE INVENTION

This invention relates to a novel jolt and vibration detector switch and system principally for use in preventing theft.

Prior to the present invention, pre-existing detectors of the general type to which the present invention is direction have been sometimes referred to as motion detectors. One of the major problems associated with such prior detectors is the fact that merely any motion—such as the rocking of a parked auto rocked by force of the wind—caused activation to give false alarms. Likewise any accidental mere single-direction one or more strokes could cause a false alarm, whatever the cause. On the other hand, typically a light jolt or low-intensity vibration or the like, often fails to set-off the alarm because of lack of sensitivity of these prior motion sensors, particularly of the ball-type to which the present invention is principally directed. Also it has been found that even drastic changes in weather temperature can cause a completed circuitry to break-away or open sufficiently to set-off an alarm. While to discuss false alarms may, on the face of the matter, seem rather insignificant, such is hardly the case in real life situations where neighbors are compelled to complain when a loud alarm becomes set-off in the middle of the night by a false alarm, and repeatedly, and when the seller or installer is called-out in the middle of the night or even repeatedly diverted from productive time during a work day by virtue of false alarms, and when police needlessly respond to false alarms when the alarm set-off an automatic dialing of the police station, pulling the police away from other critical duties. These are the real life problems that occur on a large scale, even with products (detectors) that might appear to be a quality product. These are merely some of many such problems to which the present invention is directed. Also, prior detectors required high voltage and current because of poor electrical contact. Most (if not all) prior-art switches must be level to function well.

SUMMARY OF THE INVENTION

Objects of the present invention include the overcoming or avoiding of one or more difficulties and problems, typically of the types set-forth above.

In particular, an object of the invention is to obtain a jolt or vibration detector non-responsive to mere motion.

Another object is to obtain a jolt or vibration detector having an improved high degree of sensitivity to low levels of jolt or vibration, and irrespective of whether level, inverted or slanted.

Another object is to obtain a jolt or vibration detector having improved electrical contact requiring or operable on less voltage and amperage than heretofore possible.

Another object is to obtain a jolt or vibration detector having a logic system non-responsive to random infrequently repetitious jolts or vibrations, yet responsive to frequent pulses of jarring forces, jolts or vibrations. vibration detector.

Other objects become apparent from the preceding and following disclosure.

One or more of the objects are obtained by the invention as described herein and as typically illustrated in the accompanying Figures which are intended to improve understanding but not to unduely limit the invention, such illustrations being mere examples and preferred embodiments, the invention including variations and modifications and substitution of equivalents obvious to an artisan in this particular field.

As directed toward overcoming somewhat basic problems of sensitivity—such as results in false alarms, and of an opposite sort such as result in great or large voltage and current flow thus requiring large batteries and frequent replacement of batteries and high cost and maintainance thereof, broadly the invention includes each of a particular improved jolt or vibration detection switch, and a combination of any such type of jolt or vibration detection switch in combination with a logic circuit and system thereof for requiring an excess of pulses above a predetermined minimum before sending-out a signal to an alarm system or transmitter or the like.

In the preferred novel jolt or vibration detection switch, magnetic flux is utilized to hold the circuit-making ball surface in firm and sturdy electrical contact with each of alternate opposing negative and positive electrical contacts of a printed circuit on the face of a circuit board on which the circuit's electrical contacts are preferably arranged in a consecutive series of substantially circular configuration enclosed together with the circuit-making ball by a circumscribing fence structure such as an enclosing wall. More preferably, the enclosing wall encloses a fully confined space substantially but preferably incompletely filled with a di-electric (non-conductive) fluid such as preferably silicone fluid which has been found to have unique effects. While having the di-electric fluid present in contact with the ball's electrically conductive surface and the electrically conductive surfaces of the switch electrical positive and negative contact normally would be expected to further insulate the ball surface from the contact's surfaces with an expected reduction further of circuit-making ability or characteristics that would require an even higher voltage and current flow, however the contrary has been unexpectedly discovered to be true; in particular, the presence of the di-electric fluid substantially filling the enclosure space surrounding the ball and contacts factually has been experimentally determined to enhance the sensitivity, i.e. reduce resistance to current flow. While not limited thereto, the preferred results has been obtained by use of silicone liquid, and of a preferred viscosity generally of about 100 centistrobes—with variations in viscosity thereabout being likewise preferred. However, as viscosity is further substantially increased or decreased, a loss of sensitivity or of good or best electrical-contact making characteristics can be expected in movement away from the preferred viscosity. Also, if the enclosure space within which the ball rolls around is too completely filled, reaction-movement of the ball becomes retarded; generally, a small bubble of air or other non-conductive gas should be present. Devoid of any di-electric fluid being present, sensitivity is substantially and significantly less than and below that obtained in the above-described preferred embodiments.

The magnetic flux is preferably achieved by a first large magnet of a bar type positioned behind the circuit board mounting the opposing electrical contacts and circuitry thereof—normally a printed circuit, positioned to hold the ball of magnetizable material such as steel preferably and preferably coated with an electrical conductor of high conductive characteristics such as gold or rodium metallic metals. To assure that the ball does not randomly roll toward the center of the circular arrangement of the series of electrical contacts having the negative and positive contacts occuring alternately in the series, an opposing bar magnet is positioned opposite the face of the electrical contacts with a like-pole opposing (in opposing relationship to) a corresponding like-pole of the larger magnet positioned behind the circuit board, i.e. negative pole opposing negative pole, or positive pole opposing positive pole—magnetic poles sometimes referred to as negative and positive poles and other times as north and south poles as the case may be. By the second magnet being smaller, the ball remains firmly held against the circuit board's contacts, while the like and opposing pole of the second and smaller magnet serves to repel the ball away from the central location of the like-pole of the second magnet whereby the ball is constantly repelled to positions against a restraining fence or wall structure at which locations the ball is always in proper positions for immediate and maintained circuit-making contact(s) between opposing negative and positive electrical contacts. It functions best upright (FIG. 2), but also inverted (less sensitive) or at non-level slanted angles or positions.

In such embodiments of a jolt or vibration or motion detection switch in combination with a logic circuit and system above-noted, the conventional type of logic circuit(s) already commercially available and technology being currently well-known in the art, is used in an arrangement for counting each pulse resulting from a breaking of switch-contact and also for counting each pulse resulting from a making of switch-contact, and counting the total pulses and comparing the total pulses to a predetermined set period of time, and thereafter reacting accordingly; if a predetermined minimum number of total pulses such as typically not less than two pulses occur not within—i.e. outside of—the predetermined maximum predetermined set period of time, an alarm-initiating signal will be sent from the logic circuit(s) onward to an alarm or an alarm-actuating system, or to a transmitter that transmits a signal to a receiving radio receiver, or the like for initiating an alarm and/or automatically causing the police telephone to be dialed and an alarm message sent to them. However, if the total number of pulses within the predetermined maximum set period of time is less than the minimum predetermined number, the logic circuit(s) do not send-out an alarm-initiating signal and concurrently cause the logic circuit(s) pulse-counting mechanism to reset to start again counting from a zero point, for example, as though no pulses had yet been received. According, a mere pat on the fender by an admiring buyer or slight wind pressure or change of temperature that might bring about an accidental or unintended break in circuit-making contact between the ball's electrically conductive surface and both of the negative and positive electrical contacts normally will not result in a false alarm. This is particularly true when utilizing the novel switch of this invention above-described in which the resistance to electrical flow of current has been drastically reduced together with improved holding of the ball to the board against the electrical contacts firmly, a preferred embodiment of the present invention.

The invention may be better understood by making reference to the Figures as follow.

THE FIGURES

FIG. 1 illustrates an exploded perspective view of the basic components of the novel vibration detection switch of this invention.

FIG. 2 illustrates the assembled switch of FIG. 1, including the presence of the dielectric fluid and the resin, shown in cross-section.

FIG. 3 illustrates a symbolic and diagrammatic representation of the switch together with a logic system and radio wave transmitter.

DETAILED DESCRIPTION OF THE INVENTION

Figure 4:
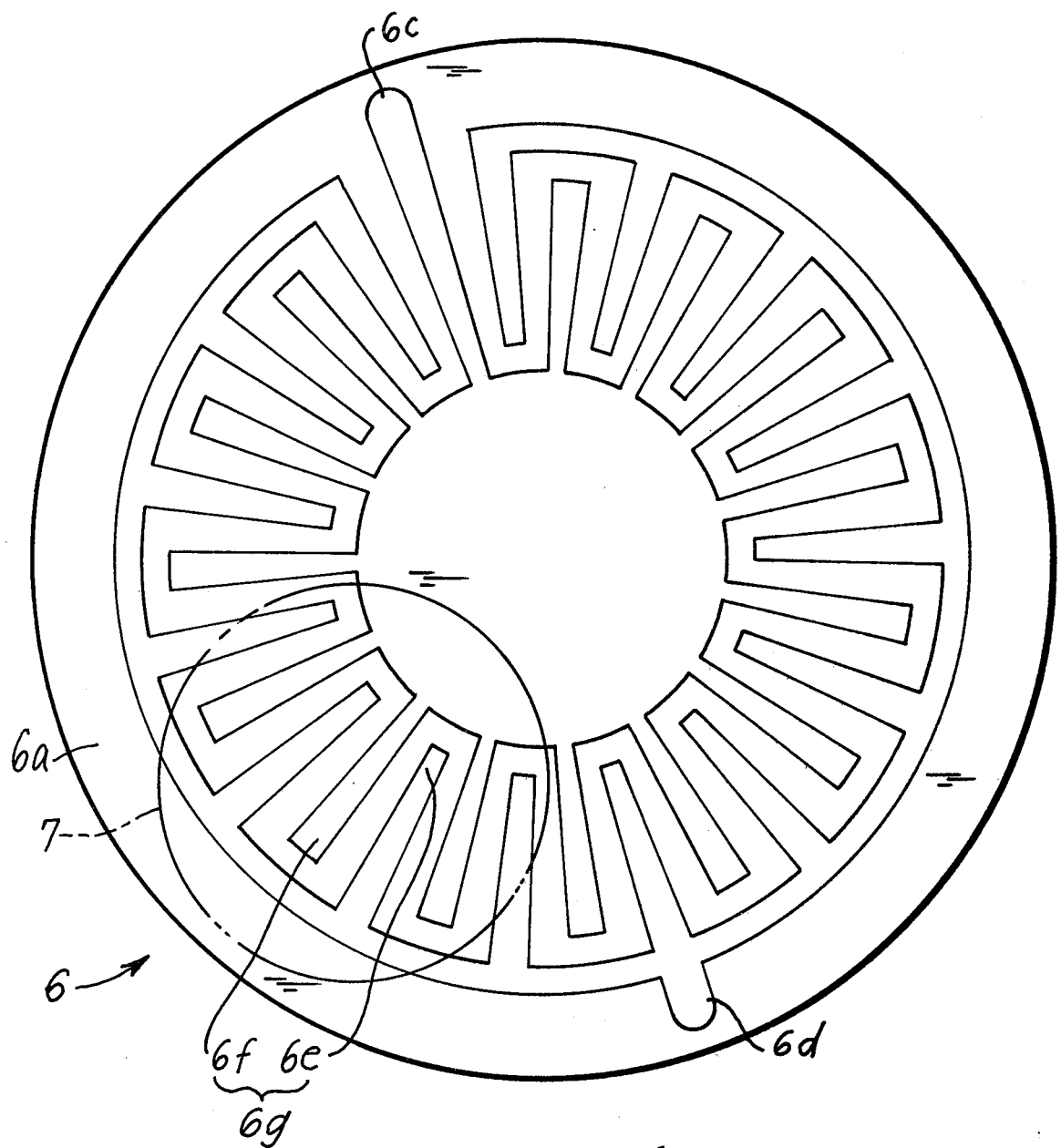
FIG. 4 illustrates a top plan view of the face of the circuit board and the printed circuit thereon, with the ball in phantom.

For the illustrative FIGS. 1 through 5, all figures illustrate a common embodiment, in so far as the identity of elements illustrated. Accordingly, for different Figures, common indicia are utilized for the same part, and description of a particular part is made only once.

FIG. 1 illustrates most of the basic elements 5 in exploded view in perspective, including the fence-like casing 13 and its enclosed through-space 13a, and the steel gold-plated ball 7 having steel interior 7b and exterior gold layer 7a both shown in cross-section of the partial cut-away of ball 7, and the inverted disc circuit board 6 having on its underface a printed circuit (not visible in FIG. 1) with the leads therefrom extending through the board as lead points 6c and 6d visible on the backface 6b of the circuit board, and the non-conductive closure disc 11 having upper surface 11a, and the small magnet 9 having its upwardly-facing North pole 9b and its downwardly-directed South pole 9a having an adhesive or other binder layer 10 on the South pole's face adhering the magnet 9 onto the face or surface 11a, and the lead wires 6c' and 6d', and the large bar magnet 8 having its upwardly-directed South pole and its downwardly-directed North pole, such that the North pole of magnet 8 is in magnetically-opposing relationship to the North pole of magnet 9, showing the magnet 8 South poles upper end surface 8a facing upwardly with both magnets 8 and 9 being positioned substantially coaxially to one-another both extending with their longitudinal axes substantially transverse to the face of the disc circuit board 6 and printed circuitry and contacts thereof. North pole bar magnet end-face 9b is in opposing relationship to the North pole bar magnet end-face 8b, in spaced-apart relationship.

In FIG. 2, in which merely the fence-like casing 13 and the sealing resin 15 (or the functional equivalent thereof) are each shown in side cross-sectional view, and likewise for disc 11, all other elements are shown in side view, including the silicone fluid 14 having bubble 16 of air. The ball is shown as magnetically pushed against the inner face of the wall of fencing-like casing 13 while being held firmly suspended against the negative and positive electrical contacts 6e and 6f (FIGS. 4 and 5) collectively designated as contacts 6g in each of FIGS. 2 and 4. The bubble 16 in a preferred embodiment is actually visible and identifiable as such, resulting from incomplete filling of the space enclosing the ball and filling-liquid above-noted as preferably silicone fluid. The relative positions of the opposing bar magnets are shown also in FIG. 2.

FIG. 3 illustrates symbolically and diagrammatically in block-diagram fashion, the disc circuit board together with its printed circuit and electrical switch contacts thereof in a normally closed state of the switching thereof. Also additionally illustrated in this FIG. 3 is the typical circuitry leads to and from the battery 17 and the logic cell(s) and system thereof, and the signal lead 19 for sending-out a signal in direction 19a, to signal input terminal 20 of the transmitter and its antenna 21 for sending an alarm-actuating signal to a receiving radio (not illustrated), such signal-receiving radio being convention and current and commercially-available technology and systems. Likewise the block-illustrated logic cell(s) 18 and transmitter terminal, transmitter and antena 21 thereof are well-known technology, together with counters, resetting mechanisms, and signal sending mechanisms thereof. Also, while not shown, it is current well-known technology to have a coding mechanism associated with the transmitter, for adjusting the sending frequency to the desired channel of a receiving alarm-initiating radio receiver.

FIG. 4 illustrate a printed circuitry face of the circuitry disc board 6 previously identified, and all elements thereof having been previously identified, and may be compared to each of FIGS. 1, 2 and 3 for corresponding illustrations.

Figure 5:
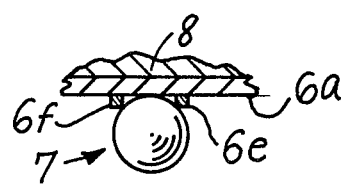
FIG. 5 is a partial view of the ball in closed-switch position.

FIG. 5 illustrates symbolically and diagrammatically a cross-sectional view through the disc circuitry board 6 and electrical contacts 6g (each of 6f and 6e) and the magnet 8 of FIGS. 2 and 1 respectively, showing the resting and circuit-making contact of the surface of the ball 7 with the contacts 6e and 6f that are mounted on the disc surface 6a.

While the illustrated embodiments are believed to obtain the optimal results with regard to objects of this invention, it is apparent from above discussions that varying degrees of satisfactory results may be obtained by variations thereon, and such variations include obvious modifications of shape and design and substitution of equivalents that are obvious to a person of ordinary skill in this particular art.

From the preceding disclosure, it should be apparent that any jar or jolt or vibration will cause the ball 7 to shift at least momentarily to thereby break circuitry electrically which break in circuitry is registered as a pulse by the logic cell(s) 18, and likewise the reseating is registered as a second pulse. Also it should be noted that the firm and secure contact of the ball's plated surface 7a with the electrical contacts 6e and 6f, especially together with the improved sensitivity achieved by use of the dielectric silicone fluid 14, has substantially eliminated the possibility of the accidental false alarms from change in weather temperature conditions and/or from a mild shifting of or rocking of an automobile in which the device is mounted. Also, a battery 17 of nominal voltage of about 1 or 2 volts is ample and sufficient for good efficiency and sensitivity, a marked change from the heretofore requirement of a large 12 volt car battery.

Also it should be noted that the utility of the novel switch as well as the greater combinations as the logic cell(s) combination typically illustrated, extends to use on or adjacent home or office or factory windows and/or door, desks, or the like, against burglary.

As workable dielectrics, typically various oils such as petroleum oils of different types and densities and viscosities and such as vegetable oils of different types, have proven to function well in reducing resistance to electrical flow between the switch contacts. However, with each of these generally noted above, the high level of sensitivity (i.e. the low resistance to electrical flow, allowing low voltage for high amperage flow) has become substantially reduced or lost after exposure to the dielectric fluid for a period of time ranging from a few days to a few weeks, whereby such chemically-active are not suitable for long-term use—microscope examination having evidenced that contacts of silver subjected to such dielectric fluids become potted seriously very quickly. Accordingly, it was found that the silicone fluid is a sufficiently inert dielectric as to not attack nor corrode the electrical contacts surfaces, whereby the high degree of improved sensitivity is retained apparently indefinitely, over extended periods of time, thus being a preferred dielectric of this invention.

As noted, above, within the scope of the invention as disclosed and discussed-above, sensitivity can be increased or decreased to some substantial degree by either (alternatively) decreasing or increasing the magnetic flux intensity (gauss) of the magnet(s), which while illustrated as permanent magnets may never-the-less be electromagnets. Likewise, accordingly, larger or smaller magnets may be utilized. In like manner, relative to the intensity of the magnetic flux, the size of the track and of the ball may be varied.

In another sense of sensitivity, the sensitivity may be varied by adjusting the logic cell(s) and system thereof to alter or change the number upwardly or downwardly of pulses (above-discussed) that are needed or required to send an initial signal, and/or to trigger a particular one or more accessory devices concurrently and/or at varying numbers of pulses for different ones of the accessory devices. For example, the typical action is for contact-making opposing contacts to "open and close" within a fraction of a second such as half-second, upon a "slight" disturbance, resulting in two consecutive pulses within that period of time. Obviously if the circuitry will only trigger an accessory device upon the occurance of four or more consecutive pulses within the predetermined maximum time period for that minimum number of pulses, the overall device and combinations thereof will be sensitive only to a more severe disturbance. A selection of the desired number of pulses may be programmed by the user by use of programming electrical switches well-known and conventional in the present commercial art.

On the basis of a private patentability search conducted in the U.S. Patent and Trademark Office, no significant nor relevant prior art (patents) was located. Typical patents include: (1) U.S. Pat. No. 4,009,662 to a Discriminating Sensor for Contact Fusing for discriminating between vibrations in flight and terminal impact, using magnetic flux to oppose movement in either direction to dampen sensitivity, and likewise a liquid filling a space in which a mass is suspended on a spring above a contact probe; in contrast, the present invention quite oppositely utilizes magnets to increase sensitivity and utilizes the liquid to improve sensitivity for a non-anchored ball devoid of springs, and altogether a totally different mechanism and use. (2) U.S. Pat. No. 3,748,415 discloses a movable magnet and ball which when one or the other is moved by inertia responsive to acceleration, breaks away from the magnetic flux pull on the other thereof and drops to initiate activation as it contact a push button; in contrast, the present invention utilizes fixed immovable magnets which utilize their magnetic fluxes to maintain the switch in a normally closed state in contact with opposing electrical contacts and in an entirely different physical arrangement and function and mechanism of operation. (3) U.S. Pat. No. 4,168,410 utilizing magnetic flux to maintain a ball on a non-conductive area in a normally-open switch state, in which ceasing of magnetic flux results in the ball becoming freed of the sustaining flux whereby the ball rolls into a circuit-making contact; in contrast, in the present invention, the magnets maintain the ball in a normally closed state of switching, and the flux is always present and enhances contact sensitivity and contact being maintained, such being totally inconsistent and totally different from the operation and function of the patent's mechanism. (4) The U.S. Pat. No. 3,270,159 for linear movement of a ball, has a ball within an elongated cylinder supported by a spring, there being no apparent similarities nor analogies to the present invention. Thus, these patents are merely noted to conform to rule requirements, as patents of interest.

I claim:

1. A vibration detection switch comprising in combination: a circuit board having a series of alternately occuring negative and positive electrical contacts arranged in a substantially circular arrangement, a ball having an electrically conductive surface of a size such that when resting between any two consecutive ones of said negative and positive electrical contacts, the ball contacts and completes electrical circuit between the two consecutive electrical contacts, said ball being of a material conductive of magnetic flux such that the ball is magnetically responsive to lines of magnetic flux of a magnet, confining means for preventing the ball from rolling off said series on said board, a magnet having first pole thereof extending substantially transversely of said board substantially centrally of said circular arrangement such that said ball is magnetically attracted and held in contact with said two consecutive ones of said negative and positive contacts, and said confining means being positioned to substantially circumscribe said series and said ball when the ball is magnetically held by said first pole, and a magnet having a second pole of a magnetic-pole charge identical to that of the first pole, the second pole being positioned extending substantially transversely of said board substantially centrally of said circular arrangement in a position of opposing relationship to said first pole and spaced from said ball when said ball is held magnetically by said first pole such that like-pole magnetic fluxes from said first and second poles cause said ball to be repelled by the second pole toward said confining means whereby at all times of rest the ball is forced to maintain contact and completed electrical circuit with said two electrical contacts except when jolted by a vibration resulting from a blow at which time there is movement of one or the other of the circuit board and the ball relative to one another sufficient to break electrical circuitry momentarily after which magnetic flux lines promptly re-establish contact and electrical circuitry between said two electrical contacts.

2. A vibration detection switch of claim 1, in which said confining means forms a housing or enclosure enclosing said series and said ball within the enclosure space thereof and wherein said enclosure space is substantially but incompletely filled with a di-electric semi-viscous liquid.

3. A vibration detection switch of claim 2, in which said semi-viscous liquid has a viscosity of about 100 centistrobes.

4. A vibration detection switch of claim 3, in which said semi-viscous liquid comprises substantially silicone fluid.

5. A vibration detection switch of claim 4, in which said ball is metallic and has a coating of gold.

6. A vibration detection switch of claim 4, in which said ball is metallic and has a coating of rhodium.

7. A vibration detection switch of claim 1, in which said ball is metallic.

8. A vibration detection switch of claim 7, in which said ball has a coating of gold.

9. A vibration detection switch of claim 7, in which said ball has a coating of rhodium.

* * * * *